United States Patent [19]

Kohno

[11] Patent Number: 4,789,208
[45] Date of Patent: Dec. 6, 1988

[54] ANTI-LOCKING BRAKE MODULATOR WITH INDEPENDENT INPUT AND OUTPUT SOLENOID ACTUATED VALVES INCLUDING CHECK VALVE AND PRESSURE RELIEF VALVE

[75] Inventor: Teruhisa Kohno, Hyogo, Japan

[73] Assignee: Sumitomo Electric Industries, Ltd., Osaka, Japan

[21] Appl. No.: 935,492

[22] Filed: Nov. 26, 1986

[30] Foreign Application Priority Data

Nov. 26, 1985 [JP] Japan .................................. 60-265407

[51] Int. Cl.$^4$ ......................... B60T 8/42; B60T 13/68; B60T 15/02
[52] U.S. Cl. ......................... 303/115; 137/596.17; 251/129.21; 303/116; 303/119
[58] Field of Search ............... 303/119, 115, 116, 118, 303/113, 114, 61-63, 68-69, 10-12, 110, 111; 188/181; 251/129.02, 129.21, 129.22, 129.18, 129.15, 129.01; 137/596.17, 627.5

[56] References Cited

U.S. PATENT DOCUMENTS

| | | | |
|---|---|---|---|
| 3,602,554 | 8/1971 | Ichimura et al. | 303/115 X |
| 3,729,169 | 4/1973 | MacDuff | 303/115 X |
| 3,747,990 | 7/1973 | Tanguy | 303/115 X |
| 4,036,534 | 7/1977 | Kondo et al. | 303/115 X |
| 4,116,495 | 9/1978 | Belart | 303/116 X |
| 4,561,701 | 12/1985 | Fujii et al. | 303/119 |
| 4,668,024 | 5/1987 | Nakanishi et al. | 303/116 X |

FOREIGN PATENT DOCUMENTS

| | | |
|---|---|---|
| 914086 | 6/1951 | Fed. Rep. of Germany . |
| 2226189 | 12/1973 | Fed. Rep. of Germany . |
| 2170458 | 9/1977 | Fed. Rep. of Germany . |
| 2942517 | 4/1981 | Fed. Rep. of Germany . |
| 2924484 | 12/1981 | Fed. Rep. of Germany . |

Primary Examiner—Douglas C. Butler
Attorney, Agent, or Firm—Sughrue, Mion, Zinn, Macpeak, and Seas

[57] ABSTRACT

An anti-locking modulator for reducing braking pressure applied to brakes during anti-locking operation dependent upon pressure in a pressure chamber. An input solenoid valve supplies pressurized fluid to the control chamber and is weakly biased to be closed so that a reduction of pressure in the pressure chamber opens the input solenoid valve for repressurization. Electrical activation of the input solenoid positively closes the input solenoid valve. An output solenoid connecting the pressure chamber to near atmospheric pressure valve is biased against the chamber pressure to be closed to thereby prevent overpressurization. Electrical activation of the output solenoid opens the output solenoid valve, thereby depressurizing the pressure chamber.

1 Claim, 2 Drawing Sheets

ANTI-LOCKING BRAKE MODULATOR WITH INDEPENDENT INPUT AND OUTPUT SOLENOID ACTUATED VALVES INCLUDING CHECK VALVE AND PRESSURE RELIEF VALVE

BACKGROUND OF THE INVENTION

1. Field of the Invention

The present invention relates to a modulator for an anti-locking device which prevents the wheels of a vehicle from being locked when the vehicle is braked.

2. Background of the Invention

An anti-locking device is well known which prevents the wheels of a vehicle from being locked when the vehicle is braked. The device includes a modulator which controls the pressure of the braking through the utilization of pressure from a pressure source (such as a pump) which is not the master cylinder, in accordance with a command from an electronic information processor which gives the command on the basis of information from a wheel revolution speed detection means. The technology is well known for dealing with the case that the working fluid of the pressure source differs from that of the brake system, such as where the working fluid of the brake system is vegetable oil and that of the pressure source is mineral oil as the pressure fluid of an engine-driven pump for power steering is utilized. It is also well known how to make the pressure source failsafe. In the art, high pressure from the pressure source is stored except in anti-locking operation and the pressure (hereinafter referred to as control pressure) of a control chamber is reduced depending on the locked state of the wheel in the anti-locking operation to indirectly reduce braking pressure by a pressure reduction means depending on the control pressure. This technique is used instead of directly draining the working fluid from the brake system to reduce the pressure of the working fluid therein and thereafter directly introducing the working fluid from the pressure source into the brake system to again increase the pressure of the working field in the brake system.

FIG. 1 briefly shows an example of the abovementioned conventional art. After pressure produced by a pump 2 driven by an electric motor 1 is accumulated in an accumulator 3, the pressure is alternately applied to a control chamber 5 through an input solenoid valve 4 and discharged from the control chamber 5 to a reservoir 7 through an output solenoid valve 6. When anti-locking operation is not performed (when the input solenoid valve 4 and the output solenoid valve 6 are not supplied with electricity, as shown in FIG. 2), the input solenoid valve 4 is open and the output solenoid valve 6 is closed so that pressure equal to that in the accumulator 3 is introduced as control pressure. A pressure reduction means reduces the pressure of a brake 15 depending on the control pressure. The pressure reduction means includes a pressure reduction piston 8 which has one end located on the control chamber 5 to receive the control pressure and has the other end located on a brake system to receive braking pressure. A valve piston 9 has a valve portion 10 and receives on one end the pressure equal to that in the accumulator 3 and receives on the other end the braking pressure. A body 16 has an inlet port 13 for pressure from a master cylinder 12, an outlet port 14 for the braking pressure to the brake 15 and a valve seat 11 with which the valve portion 10 is brought into contact to constitute a shutoff valve to disconnect the inlet port 13 from the outlet port 14. The body 16 houses the pressure reduction piston 8 and the valve piston 9. The pressure in the accumulator 3 is set to be higher than that in the brake 15, and the pressure reception area A of the pressure reduction piston 8 is larger than the corresponding area B of the valve piston 9. For that reason, when the anti-locking operation is not performed, as shown in FIG. 1, the pressure reduction piston 8 is urged leftward (as illustrated in the drawing), the valve portion 10 is separated from the valve seat 11 to open the shutoff valve, and the pressure produced in the master cylinder 12 is directly applied to the brake 15.

When the braking pressure applied to the brake 15 becomes excessively high and the anti-locking operation is required, the input solenoid valve 4 and the output solenoid valve 6 are suplied with electricity so that the input solenoid valve 4 is closed and the output solenoid valve 6 is opened. As a result, the pressure fluid in the control chamber 5 is drained from the control chamber 5 to reduce the control pressure, the pressure reduction piston 8 is moved toward the control chamber 5 (rightward in the drawing), and the valve portion 10 of the valve piston 9 is brought into contact with the valve seat 11 to close the shutoff valve to disconnect the inlet port 13 and the outlet port 14 from each other. When the control pressure is reduced further, only the pressure reduction piston 8 is moved further toward the control chamber 5 to increase the volume of a closed circuit including the brake 15, to reduce the braking pressure.

When the supply of the electricity is stopped to both the input solenoid valve 4 and the output solenoid valve 6, the pressure in the accumulator 3 is again introduced into the control chamber 5 and the pressure-reduction piston 8 compresses the brake system in accordance with the rise in the control pressure so as to again increase the braking pressure.

The braking pressure necessary for smooth anti-locking operation can be maintained by supplying electricity to only the input solenoid valve 4 to close it to keep the control pressure constant.

Therefore, the modes of pressure reduction, pressure keeping and pressure reincreasing, all which are necessary for the anti-locking operation, can be performed by selectively supplying power to the solenoid valves 4 and 6. Pressure reduction is achieved by supplying electricity to both the solenoid valves 4 and 6; pressure keeping, by supplying electricity to only the input solenoid valve 4; and pressure reincreasing, by not supplying electricity to either of the valves 4 and 6.

If the pressure in the accumulator 3 should fall due to a problem such as a failure, fluid leakage or the like of the pump 2, the urging force acting to the pressure reception area B of the valve piston 9 in such a direction as to close the shutoff valve decreases so that even if the brake 15 is put in action in that state so as to increase the braking pressure over the pressure in the accumulator 3 to move the pressure reduction piston 8 toward the control chamber, the braking pressure acting to the pressure reception area B of the valve piston 9 keeps the shutoff valve in its open position to secure the operation of the brake 15.

However, the above-described conventional art has difficulties as described below. The first problem is that although the closure of the shutoff valve of the pressure reduction means is avoided at the time of the fall in the pressure in the accumulator 3 to secure the connection of the master cylinder 12 and the brake 15, an excessive stroke of the master cylinder is consumed in comparison to the normal operation because of the movement of the pressure reduction piston 8 toward the control chamber 5 so that the controllable braking pressure drops. This excessive stroke is accentuated since the anti-locking operation is usually performed ona plurality of wheels through a plurality of control channels. Therefore, the same number of each of the input solenoid valve 4, the output solenoid valve 6, the control chamber 5 and the pressure reduction means as the control channels are needed. The second problem is hereafter described. The continuously rotating type of a pressure source for anti-locking operation uses an engine-driven pump or the like. Therefore a mechanical means such as an unloader valve, is needed for preventing the pressure of the pressure source from becoming higher than a prescribed level. In the emergency rotation type of a pressure source, a pump is driven by an electric motor. It is thus necessary to use an electric pressure switch to keep the pressure of the pressure source constant. In the abovedescribed conventional art wherein the pressure of the control chamber needs to be always kept high except in the anti-locking operation it is necessary to provide a mechanical relief valve to prevent a pressure rise due to a temperature rise or to make an electric pressure control means failsafe so as to preclude an abnormal rise in the pressure of the pressure source. For that reason, the design for practicing the art is complicated, the reliability of the resultant structure is low, and its cost is high. This is the second problem.

SUMMARY OF THE INVENTION

Accordingly, it is an object of the present invention to provide an anti-locking modulator of high reliability and low cost.

The anti-locking modulator of the invention can be summarized as including a pressure chamber pressurized by a pressure source except during anti-locking operation. Input and output solenoid valves supply the pressure from the pressure source and relieve it. Both solenoids in action have movable valve elements engaging fixed valve seats. In the input solenoid valve, a weak spring normally biases the valve closed unless the pressure in the pressure chamber falls. The valve is electrically positively closed by the solenoid. In the output solenoid valve, a spring biases the valve closed against the pressure in the pressure chamber and the spring force is set slightly higher than the desired pressure. The output valve is opened by the electrical operation of the output valve solenoid.

DETAILED DESCRIPTION OF THE PREFERRED EMBODIMENTS

The anti-locking modulator provided according to the present invention comprises a control chamber into which a pressure fluid is introduced from a pressure source so that high pressure is stored in the control chamber except in anti-locking operation and reduced depending on the locked state of a wheel in the anti-locking operation. A pressure reduction means reduces braking pressure depending on the pressure in the control chamber. An input solenoid valve is provided in an inflow passage for the pressure fluid to the control chamber and includes an open/close valve which consists of a fixed valve seat and a movable valve element and is opened or closed by an electromagnetic force so as to regulate the quantity of inflow of the pressure fluid to the control chamber. An output solenoid valve is provided in an outflow passage for the pressure fluid from the control chamber. It includes an open/close valve which consists of a fixed valve seat and a movable valve element and is opened or closed by an electromagnetic force so as to regulate the quantity of outflow of the pressure fluid from the control chamber.

In the anti-locking modulator, the movable valve element of the input solenoid valve is urged toward the fixed valve seat by a spring so as to be always put in contact with the fixed valve seat. The force of the contact of the movable valve element and the fixed valve seat is increased by the electromagnetic force at the time of supply of electricity to the input solenoid valve to prevent the pressure fluid from flowing into the control chamber. The high pressure pressure fluid is relieved against the urging force of the spring and flows into the control chamber at the time of non-supply of electricity to the input solenoid valve.

Figure 1:
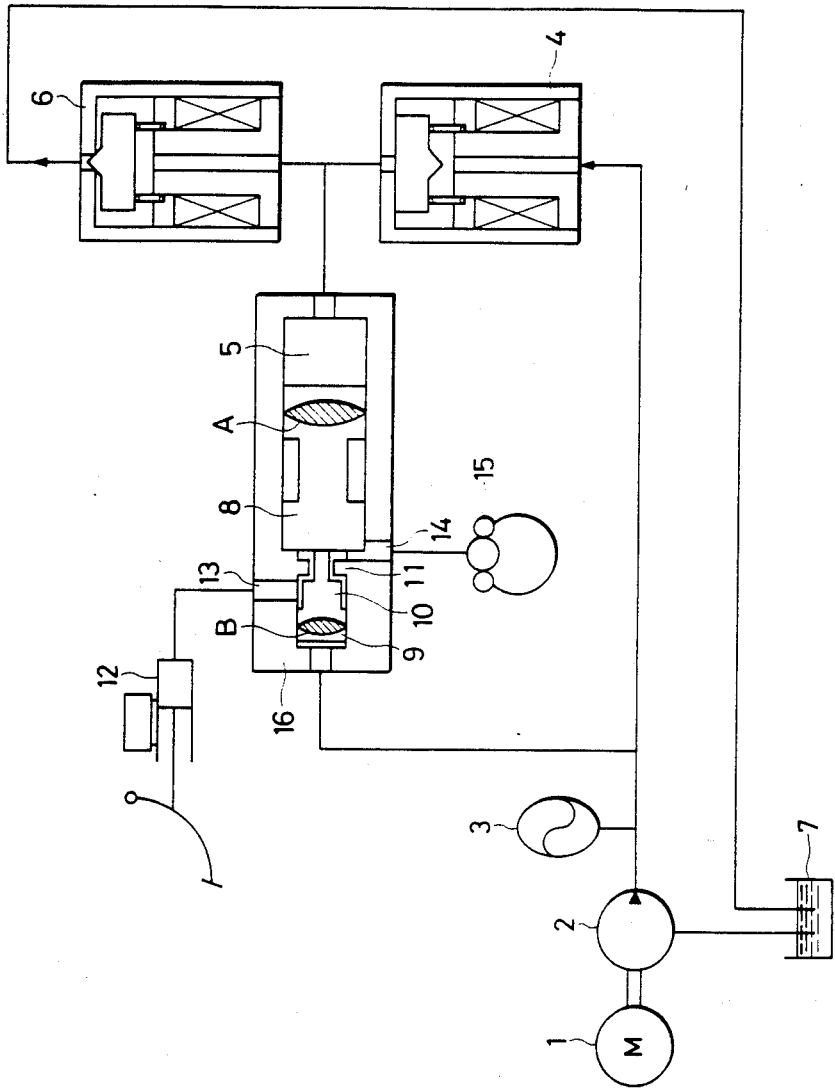
FIG. 1 shows a schematic sectional view of the main part of a conventional anti-locking modulator.

The direction of the urging force of the spring which urges the movable valve element of the input solenoid valve is made opposite to that in the conventional art shown in FIG. 1, to place the movable valve element in contact with the fixed valve seat, even at the time of non-supply of electricity to the input solenoid valve, so that the flow of the pressure fluid passing through the input solenoid valve is always directed from the pressure source toward the control chamber. As a result, even if the pressure in the accumulator falls, the pressure fluid in the control chamber cannot flow back toward the accumulator through the input solenoid valve, so that high pressure is maintained in the control chamber to prevent the movement of a pressure reduction piston to avoid wasting the stroke of a master cylinder. The first problem mentioned above is thus solved.

The movable valve element of the output solenoid valve is urged by a spring against the pressure in the control chamber at the time of non-supply of electricity to the output solenoid valve so as to be placed in contact with the fixed valve seat thereof to maintain in the control chamber only the pressure of the pressure fluid which is not higher than a prescribed level determined by the urging force of the spring. The movable valve element is placed out of contact with the fixed valve seat by the electro-magnetic force at the time of supply of electricity to the output solenoid valve to drain the pressure fluid from the control chamber. The direction of the output solenoid valve is thus made entirely opposite to that in the conventional art shown in FIG. 1, so that if the pressure in the control chamber should abnormally rise at the time of non-supply of electricity to the output solenoid valve, the abnormal pressure increment above a level determined by the urging force of the spring which urges the movable valve element in such a direction as to close the valve is relieved. As a result, the second problem mentioned above is solved without adding a new device or component.

Figure 2:
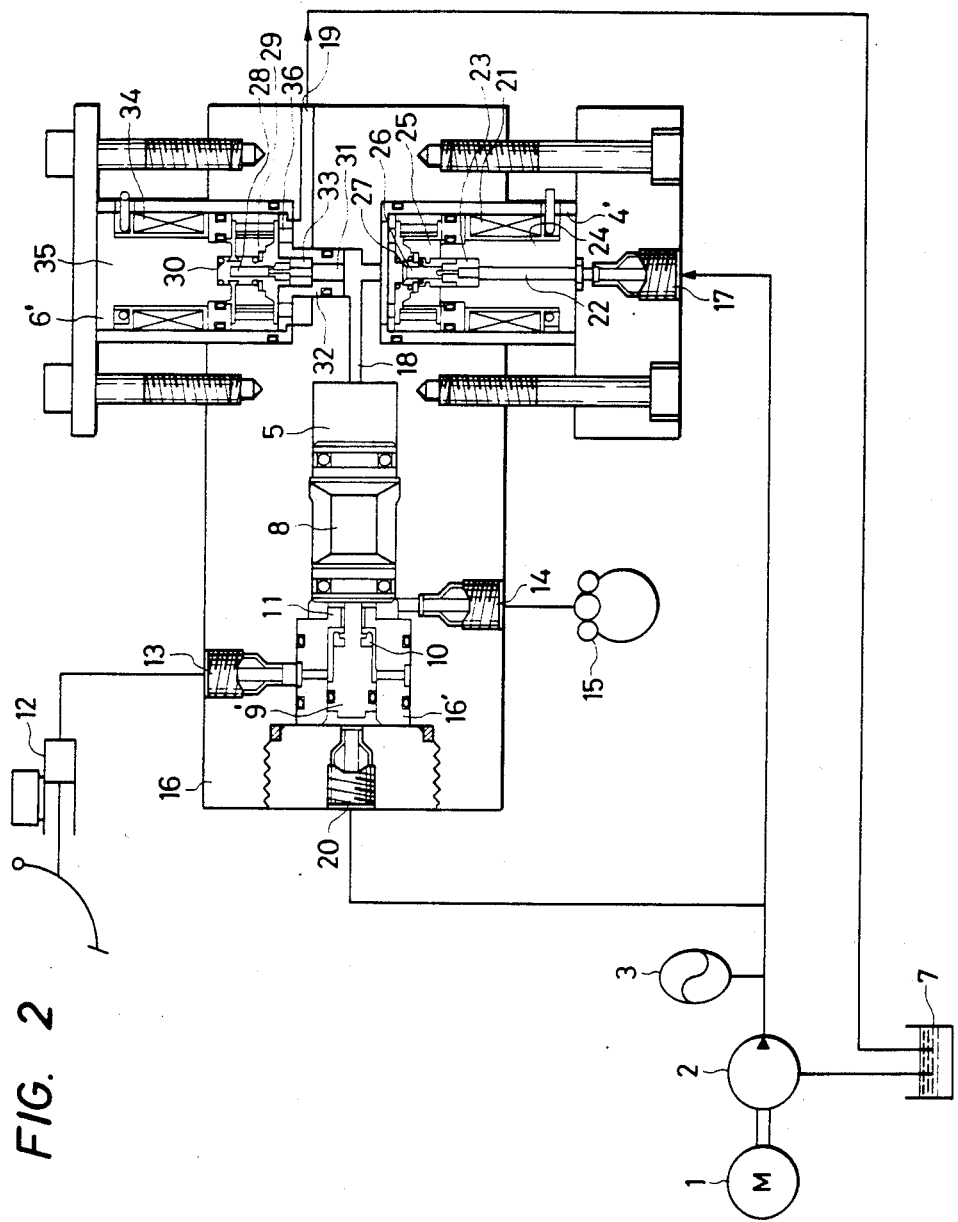
FIG. 2 shows a schematic sectional view of the main part of an anti-locking modulator which is an embodiment of the present invention.

An embodiment of the present invention, which is an anti-locking modulator shown in FIG. 2 in which like elements to FIG. 1 have like numeral designations and similar elements have prime designations, is hereafter described. Pressure is produced by a pump 2 driven by an electric motor 1 and is accumulated in a accumulator 3. The so produced pressure is applied to a port 17 of an input solenoid valve 4' and then applied to a control chamber 5 through a passage 18. Pressure fluid in the control chamber 5 is drained to a reserve tank 7 through an output solenoid valve 6' and a port 19. Braking pressure produced in a master cylinder 12 is introduced into a pressure reduction means, similar to that of FIG. 1, through an inlet port 13 and applied to a brake 15 through an outlet port 14.

The pressure in the accumulator 3 is introduced into the pressure reduction means through a port 20. The construction of the pressure reduction means is the same as the conventional art shown in FIG. 1, except that a sleeve 16' which has a fixed valve seat 11 and guides a valve piston 9' to slide is provided separately from a body 16. Therefore, the construction of the pressure reduction means is not here described in detail.

A stator 24 has a fluid passage 22 in the center of the stator and is press-fitted with a fixed valve seat 23 at the end of the stator 24. When electricity is supplied to the solenoid 21 of the input solenoid valve 4', an armature 25 attracted toward the stator 24 is moved together with a movable valve element 26. The armature 25 is also urged toward the fixed valve seat 23 by a spring 27 the valve element functioning as a check valve. As a result, the flow of the pressure fluid passing through the fixed valve seat 23 is directed only to relieve the pressure fluid against the urging force of the spring 27.

In the output solenoid valve 6', an armature 29, which is moved together with a movable valve element 28, is urged by a spring 30 toward a fixed valve seat 33 press-fitted in a frame 32 having a fluid passage 31 in the center of the frame. When electricity is not supplied to a solenoid 34 of the output solenoid valve 6', the valve is closed. When electricity is supplied to the solenoid 34, of the output solenoid valve 6', the armature 29 is attracted toward a stator 35 against the urging force of the spring 30 to open the valve to connect the passage 31 and the outlet port 19 to each other through a passage 36.

The urging force of the spring 27 of the input solenoid valve 4' is set at a very small value, while that of the spring 30 of the output solenoid valve 6' is set at such a value as to maintain a pressure slightly higher than the prescribed maximum pressure in the control chamber 5 thereby functioning as a pressure relief valve. As a result, pressure lower than that in the accumulator 3 by a very small quantity determined by the spring 25 of the input solenoid valve 4' is maintained in the control chamber 5 except in anti-locking operation. As a result, if a control system for the electric motor 1 should operate abnormally to continue the rotation of the pump 2 or if the pressure fluid in the control chamber 5 should expand due to a temperature rise, the pressure fluid is relieved at the time of its pressure reaching a level determined by the urging force of the spring 30 of the output solenoid valve 6' and flows back to a reserve tank 7, thus acting as a pressure relief valve and avoiding an abnormal pressure rise and protecting components from damage due thereto.

When electricity is supplied to the solenoids 21 and 34 of the input solenoid valve 4' and the output solenoid valve 6' in the anti-locking operation, an electromagnetic force acts on the armature 25 of the input solenoid valve 4' in such a direction as to increase the urging force of the spring 27 to completely block the inflow of the pressure fluid from the accumulator 3. Also, the armature 29 of the output solenoid valve 6' is moved together with its movable valve element 28 toward the stator 35 against the urging force of the spring 30 to open the valve to drain the pressure fluid from the control chamber 5 to the reserve tank 7 through the port 19 to reduce the control pressure in the control chamber. At that time, a pressure reduction piston 8 is moved toward the control chamber 5 to close a shutoff valve consisting of the valve portion 10 of the valve piston 9' and the valve seat 11 of the sleeve 16', to disconnect the master cylinder 12 and the brake 15 from each other. When the pressure reduction piston 8 is moved further toward the control chamber 5, the pressure reduction piston 8 is removed from contact with the valve piston 9' to increase the volume of a closed circuit including the brake 15, to reduce the pressure of the brake 15. A pressure reduction mode is thus performed.

When electricity is supplied to only the input solenoid valve 4', the output solenoid valve 6' is closed so as to keep the pressure in the control chamber 5 at a prescribed level to hold the pressure reduction piston 8 in a prescribed postion to keep the pressure of the brake 15 at a prescribed level. A pressure keeping mode is thus performed.

When electricity is not supplied to either the input solenoid valve 4' or the output solenoid valve 6', a state shown in FIG. 2 is again established to again introduce the pressure fluid into the control chamber 5 from the accumulator 3 to move the pressure reduction piston 8 in such a direction as to decrease the volume of the brake system to increase the pressure of the brake 15. A pressure reincreasing mode is thus performed.

If the pressure in the accumulator 3 should fall due to a problem such as a leak from piping occurring at times other than during the anti-locking operation, the input solenoid valve 4' functions as a check valve so that the high pressure attained before the occurrence of the trouble is stored in the control chamber 5, the pressure reduction piston 8 stays in a position shown in FIG. 2, and the shutoff valve is kept open. For that reason, normal braking operation is not at all hindered.

The software of an electronic information processor is prearranged so that if the trouble should occur during the anti-locking operation, abnormal low pressure in the accumulator 3 is monitored so as to not supply electricity to the input solenoid valve 4 and the output solenoid valve 6'. As a result, even if the pressure reduction piston 8 is in such a position to close the shutoff valve, the pressure fluid in the control chamber 5 is not drained therefrom after the occurrence of the touble. If the pressure fluid is incompressible, the pressure reduction piston 8 stays at a standstill in that position, and pressure introduced through the port 20 and urging the valve piston 9' in such a direction as to close the shutoff valve drops. As a result, the master cylinder pressure introduced through the port 13 urges the valve piston 9 to move it in such a direction as to open the shutoff valve to connect the ports 13 and 14 to each other. The stroke of the master cylinder is thus prevented from being wasted due to the movement of the pressure reduction piston 8, so that normal braking operation after the occurrence of the trouble is maintained.

Although the pressure reduction means in the above-described embodiment comprises the shutoff valve (which consists of the valve portion 10 and the valve seat 11), together with the valve piston 9' and the pressure reduction piston 8, entirely in the same design as the conventional art shown in FIG. 1, the present invention is not confined to that design but can be applied to any design in which braking pressure is indirectly regulated depending on the pressure in a control chamber.

Although the anti-locking modulator described above is constructed separately from the electric motor 1, the pump 2, the accumulator 3 and the reserve tank 7, the modulator may be constructed integrally with these components.

According to the present invention, a check value function is added to an input solenoid valve. As described above, an increase in the stroke of a pedal at the time of a trouble of a control pressure source and a fall in controlled braking pressure due to the increase are prevented. Furthermore, a relief valve function is added to an output solenoid valve so that an abnormal rise in the pressure of a control chamber and a misoperation due to the abnormal rise are prevented. These beneficial results are very easily produced without adding a completely new component or device to the conventional equipment.

Since the movable valve element of the input solenoid valve is always placed in contact with the fixed valve seat thereof by a very weak urging force, the stroke of an armature which is moved together with the movable valve element is almost zero (the armature is slightly moved in such a direction as to open the valve, due to the flow of a pressure fluid in a pressure increase mode) so that the responding property of the valve is enhanced and the electromagnetic force thereof is allowed to be weak enough to diminish the consumption of electric power. The input solenoid valve in the conventional art needs an electromagnetic force not weaker than the urging force of the spring in such a direction as to open the movable valve element.

Although an electromagnetic force not weaker than the sum of both the spring force for urging the movable valve element in such a direction as to close the valve and an urging force based on control pressure to put the movable valve element of the fixed valve seat is needed in the output solenoid valve in the conventional art at the time of the closure of the valve, only an electromagnetic force equal to the remainder in the subtraction of a control-pressure-based urging force from a spring force is needed.

What is claimed is:

1. An anti-locking modulator, comprising:
a pressure source of pressurized fluid;
a control chamber receiving said pressurized fluid;
a brake pressure cylinder for supplying braking pressure to a brake;
pressure reduction means for reducing said braking pressure during an anti-locking operation depending on the pressure level of said pressurized fluid in said control chamber;
an input solenoid valve connecting said pressure source and said control chamber and including a fixed first valve seat, a movable first valve element seating on said first valve seat, an armature operatively engaging said first valve element to the side of said first valve element opposite said valve seat, a first spring on the side of said armature and said movable first valve element opening to said control chamber for biasing said first valve element towards said first valve seat, and a first solenoid operatively positioned with respect to said armature such that when electrically powered further forces said first valve element against said first valve seat to prevent said pressurized fluid from flowing into said control chamber, and wherein when said first solenoid is electrically deenergized, said pressurized fluid from said pressure source is applied against said first spring to unseat said movable first valve element and permits pressurized fluid flow into said control chamber; and said first spring acts on said movable first valve element such that said first solenoid valve functions as a check valve to prevent pressurized fluid from flowing from said control chamber to said pressure source; and
an output solenoid valve independent of said input solenoid valve connecting said control chamber to a reduced pressure region and including a fixed second valve seat, a second movable valve element and an armature on the side of said second valve seat proximate to said reduced pressure region, and a second solenoid which when energized moves said second valve element away from said second valve seat, a second spring engaging said armature and biasing said second valve element against said pressurized fluid in said control chamber to maintain said second movable valve element closed against said second valve seat when said second solenoid is electrically deenergized, and wherein said biasing force of said second spring is in excess of that of said first spring so that said second valve element functions as a pressure relief valve with said pressurized fluid maintained in said control chamber at a pressure no higher than a prescribed pressure determined by said second spring, and wherein said second solenoid, when electrically energized, is of sufficient power to move said second valve element out of sealing contact with said second valve seat against the bias of said second spring to drain said pressurized fluid from said control chamber.

* * * * *